United States Patent
Hoerner et al.

(10) Patent No.: US 7,148,283 B2
(45) Date of Patent: Dec. 12, 2006

(54) THERMOPLASTIC ELASTOMER THIN-WALLED FILM, METHOD FOR PREPARING SAME AND USES THEREOF

(75) Inventors: Pierre Hoerner, Maysel (FR); Thierry Sirdey, Taverny (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/502,796

(22) PCT Filed: Jan. 22, 2003

(86) PCT No.: PCT/FR03/00202

§ 371 (c)(1),
(2), (4) Date: May 4, 2005

(87) PCT Pub. No.: WO03/066729

PCT Pub. Date: Aug. 14, 2003

(65) Prior Publication Data

US 2005/0228116 A1    Oct. 13, 2005

(30) Foreign Application Priority Data

Feb. 8, 2002    (FR)    ................................. 02 01548

(51) Int. Cl.
*C08K 5/01* (2006.01)
(52) U.S. Cl. ...................... 524/476; 524/484; 524/515; 524/528
(58) Field of Classification Search ................ 524/515, 524/476, 484, 528; 428/515
See application file for complete search history.

(56) References Cited

U.S. PATENT DOCUMENTS 6,050,871 A     4/2000   Chen
6,161,555 A  *  12/2000  Chen ......................... 132/321

FOREIGN PATENT DOCUMENTS

| EP | 0 254 346 | 1/1988 |
| EP | 0 884 359 | 12/1998 |
| WO | 01 83609 | 11/2001 |

* cited by examiner

*Primary Examiner*—Kriellion Sanders
(74) *Attorney, Agent, or Firm*—Oblon, Spivak, McClelland, Maier & Neustadt, P.C.

(57) ABSTRACT

The invention concerns a thermoplastic elastomer thin-walled film, the method for preparing same and use thereof for making thin-walled elastomer articles such as gloves, rubber fingers or condoms.

25 Claims, 3 Drawing Sheets

THERMOPLASTIC ELASTOMER THIN-WALLED FILM, METHOD FOR PREPARING SAME AND USES THEREOF

The present invention relates to a thermoplastic-elastomer-based thin-walled film, to its method of preparation and to its use for the manufacture of thin-walled elastomer articles such as gloves, fingerstalls or condoms.

Natural latex has been used for a long time for the manufacture of thin-walled articles (gloves, fingerstalls, condoms) by the dipping process. The film is formed by evaporation of the water contained in the latex layer deposited on a former, and coagulation of the rubber particles. It is then vulcanized (chemical crosslinking) so as to increase its mechanical properties.

Thanks to its very good mechanical properties, even as a thin-walled film, and its attractive price, natural latex is the reference material for these applications.

However, natural latex has at least three major drawbacks:
the presence of microperforations in the films;
allergy and sensitivity problems caused by the material; and
sensitivity to both oxidation and ageing.

The holes are due mainly to impurities contained in the latex dispersions and to the presence of microbubbles during manufacture, and/or are brought about during use of said article.

The allergy problems are inherent owing to the presence of allergenic proteins contained in the natural latex serum and to the presence of various agents used in formulating the latex, such as coagulants, accelerators and other antioxidants.

Certain synthetic elastomers, most particularly thermoplastic elastomers, are used for the purpose of remedying the drawbacks resulting from the use of natural latex.

However, their use is more complicated and involves dissolving elastomers in a solvent medium. The elastomer solution in a solvent medium is deposited on a former during the dipping operation, the elastomer film then forming in a second step during evaporation of the solvent.

The development of a thermoplastic elastomer formulation for the manufacture of thin-walled flexible articles, such as gloves or condoms, using a dipping process must furthermore take into account the following technological criteria:
the chemical nature of the non-volatile compounds, such as elastomer(s), plasticizers and other compounds employed); in particular, it is important to take account of their compatibility with the regulations applicable to the envisioned applications (medical applications, especially in the case of medical devices);
the nature of the volatile compounds (solvents) used for dissolving the non-volatile compounds; in particular, it is important to take account of their toxicity with respect to the user and to the environment;
solution characteristics of the non-volatile compounds in the solvents used (solids content, viscosity), the economic objective being to have the least possible solvent to evaporate; and
the quality of the film formed after evaporating the solvent, and above all the appearance of the film, which must exhibit very good homogeneity ("film stretch"), and also the mechanical properties of the material, essentially the flexibility and tensile strength.

Thus, it has for example already been proposed, especially in international application WO 95/00586, to produce thin-walled articles, such as gloves or condoms, using a dipping process placed on a solution of a predominant mixture of a styrene-butylene-styrene (S-B-S) copolymer and of a styrene-isoprene-styrene (S-I-S) copolymer in an inert aliphatic solvent in the presence of a plasticizer. The articles obtained using such copolymers are not entirely satisfactory insofar as they remain very sensitive to oxidation and consequently their initial properties are degraded over the course of ageing.

It has also already been proposed, especially in patent application EP 0 488 021, to produce thin-walled elastomer articles by a dipping process, using a solution of at least two styrene/ethylene-butylene/styrene (S-EB-S) copolymers of different viscosity and of a plasticizer, such as a mineral oil, in an organic solvent such as toluene. Although the articles obtained using such copolymers do not have the drawback of being sensitive to oxidation, their manufacture requires the use of aromatic organic solvents such as toluene, which solvents are most particularly toxic and their use should, of course, be avoided from the ecological standpoint.

In the particular case of elastomer materials manufactured from S-EB-S copolymers, the mechanical properties depend directly on the nature of the elastomer used (molar mass and styrene (PS) content) and on the way in which the film is formed (film-formability).

In particular, it is accepted by those skilled in the art ("*Kraton Polymers for Adhesives and Sealants*", Shell Chemical Company, 1992, SC198-92; M. Morton et al., J. Poly. Sci., 1969, Part C, 99–115; J. F. Beecher et al., J. Poly. Sci., 1969, Part C, 26, 117–134; G. Kim et al., Macromolecules, 1998, 31, 2569–2577; and N. R. Ledhe et al., "*Thermoplastic Elastomers: A Comprehensive Review*", 1987, Hanser Publishers, Munich) that the balance between the elastomer properties, on the one hand, and the thermoplastic properties, on the other, stem from the phase organization of the material. Owing to the incompatibility between the two blocks, i.e. the EB block and the PS block, the copolymer organizes itself in the form of PS microdomains dispersed in an EB elastomer matrix. The PS domains, which are "hard" at room temperature, serve as physical crosslinking nodes and provide the film thus formed with elasticity and mechanical strength. These characteristics depend on the manner in which these microdomains are organized, the most favorable case corresponding to optimum separation between the two phases.

The S-EB-S copolymers commercially available, and such as those used in patent application EP 0 488 021, mostly have a PS content of between 25 and 30% by weight relative to the total weight of S-EB-S. The solution characteristics and the characteristics of the film that is formed depend on the molar mass of S-EB-S used. These characteristics are given in Table I below:

TABLE I

| Molar mass of the S-EB-S (in g/mol) | Viscosity of the solution (aromatic solvent) | Film formability | Mechanical properties of the plasticized film |
|---|---|---|---|
| <75 000 | Low | Good | Poor |
| >75 000 | High | Poor | good |

This table shows that just the use of S-EB-S having a high molar mass (typically >75 000 g/mol) makes it possible to obtain plasticized films exhibiting satisfactory mechanical properties, but such elastomers are rather difficult to dissolve and do not form correct films.

This is why the elastomer formulations described in patent application EP 0 488 021 are composed of a blend of at least two S-EB-Ss (at least one S-EB-S of high molar mass, the film formability of which is facilitated by the presence of at least one S-EB-S of low molar mass), a plasticizer and an aromatic solvent, which is preferably toluene.

As we mentioned above, within the general context in which the protection of individuals and of the environment is of increasing concern in the design of new formulations, it is of paramount importance to avoid as far as possible the use of aromatic solvents, such as toluene, and, on the contrary, to promote the use of cycloaliphatic solvents.

However, since cycloaliphatic solvents have a much lower solvent power than aromatic solvents, the effect of the molar mass of the S-EB-S on the solution viscosity is further exacerbated. Under these conditions, the viscosity of the solutions obtained using S-EB-S of high molar mass becomes incompatible with that required for the manufacture of a film by the dipping process.

It is therefore to remedy these major problems that the Applicant developed that which forms the subject of the invention. In particular, the Applicant was given the objective of achieving a thermoplastic material having all the required qualities in terms of filmformability and mechanical properties, and being able to be manufactured by a dipping process based on the solution of an S-EB-S copolymer in a cycloaliphatic or predominantly cycloaliphatic solvent.

The subject of the present invention is firstly a thermoplastic-elastomer-based film, characterized in that it comprises:

a single styrene/ethylene-butylene/styrene block copolymer having a molar mass greater than or equal to 75 000 g/mol;

at least one structuring agent chosen from styrene/ethylene-propylene/styrene/ethylene-propylene (S-EP-S-EP) block copolymers; and at least one plasticizer.

The thermoplastic elastomer film according to the invention has the advantage of being able to be obtained by a dipping process using a cycloaliphatic or predominantly cycloaliphatic solvent, thereby reducing the toxicity risks incurred by the use of aromatic solvents in large volumes. Moreover, the presence of the structuring agent as defined above makes it possible, as will be demonstrated in the illustrative examples below, to obtain a higher solids content (more concentrated starting elastomer solutions), and to do so without causing an increase in the viscosity of said starting solutions. This is because solutions of just S-EP-S-EP in a cycloaliphatic solvent are not very viscous; consequently, the addition of this structuring agent to the solution of S-EB-S block elastomer as defined above makes it possible, by dilution effect, to lower the viscosity of the resulting solution and consequently allows thermoplastic elastomer films to be manufactured by a dipping process.

In addition, owing to its tetrablock structure, said S-EP-S-EP structuring agent improves the film formability of the S-EB-S block elastomer. Its highly beneficial effect is detectable right from the step of forming the film, during which it increases the molecular mobility of the EB and PS blocks of the S-EB-S and thus promotes their organization in the solid state.

Finally, it exhibits excellent mechanical properties, in particular a very good "film stretch" and good tensile strength.

According to the present invention, the expression "predominantly cycloaliphatic solvent" is understood to mean a cycloaliphatic solvent containing at most 25% by weight of aromatic solvent.

Preferably, this aromatic solvent content is less than or equal to 10% by weight.

The S-EB-S block copolymers that can be used for manufacturing the thermoplastic elastomer film according to the invention preferably contains 29 to 33% styrene by weight relative to the total weight of the copolymer.

According to the invention, such S-EB-S block copolymers preferably have a molar mass of between 75 000 and 300 000 g/mol.

Furthermore, they preferably have a solution viscosity, as a 10 wt % solution of copolymer in toluene at 25° C., of at least 400 mPa·s and even more particularly between 250 and 2500 mPa·s. This viscosity is measured using a shear-rate-controlled rotational viscometer of the BROOKFIELD® LVT type fitted with an L3 spindle.

In the rest of the description and unless otherwise indicated, any reference to a viscosity value must be understood as having been measured as indicated above.

Such S-EB-S copolymers are, for example, sold under the brand names KRATON® G1654ES, KRATON® G1650ES and KRATON® G1651ES by Kraton Polymers.

According to the invention, the S-EP-S-EP block copolymers are preferably chosen from compounds having a molar mass of less than or equal to 200 000 g/mol and more particularly between 50 000 and 100 000 g/mol.

According to one advantageous embodiment of the invention, the S-EP-S-EPs are chosen from compounds containing at most 25% by weight of styrene relative to the total weight of the S-EP-S-EP block copolymer.

They furthermore preferably have a viscosity, as a 25 wt % solution of copolymer in toluene at 25° C., of at least 1800 mPa·s and even more particularly between 250 and 2500 mPa·s.

Among these S-EP-S-EPs, mention may especially be made, by way of example, of the copolymer sold under the brand name KRATON® G1730 by Kraton Polymers.

According to one particularly advantageous embodiment of the invention, said structuring agent represents from 5 to 50 parts by weight per 100 parts by weight of S-EB-S.

The plasticizer is preferably chosen from mineral oils, among which mention may especially be made of mineral oils such as the paraffinic oils sold under the names PRIMOL® 352 and MARCOL® 82 by Esso.

According to one particularly advantageous embodiment of the invention, said plasticizer represents from 25 to 150 parts by weight per 100 parts by weight of S-EB-S.

The thermoplastic elastomer film according to the invention may be in the form of a monolayer or multi-layer material and may furthermore contain one or more active chemical substances such as an antiseptic agent and/or virucide.

Such active chemical substances may especially be chosen from quaternary ammoniums, in particular dimethyldidecyl ammonium and benzalkconium chloride; block copolymers with biocidal activity, such as polydimethylsiloxane-polyoxyethylene block copolymer; biguanides, such as water-soluble chlorhexidine salts, such as chlorhexidine digluconate; phtharaldehyde; phenolic derivatives, such as hexachlorophene; nonionic surfactants containing a polyoxyethylene sequence, such as octoxynol (or TRITON® X100); hexamedine; and mixtures thereof.

When they are used, the active chemical substance or substances preferably represent from 5 to 25% by weight relative to the total weight of said elastomer film.

According to the invention, the elastomer film preferably has a thickness of between 200 μm and 800 μm.

The thermoplastic elastomer film according to the invention may especially be in the form of gloves, fingerstalls, condoms, etc.

The subject of the present invention is also the use of at least one thermoplastic film as defined above for the manufacture of thin-walled elastomer articles such as gloves, fingerstalls or condoms.

The subject of the present invention is also a method of preparing said thermoplastic elastomer film, characterized in that it comprises:

(a) the preparation of a liquid solution (A) by dissolving a single styrene/ethylene-butylene/styrene block copolymer having a molar mass greater than or equal to 75 000 g/mol, of at least one structuring agent chosen from styrene/ethylene-propylene/styrene/ethylene-propylene block copolymers and of at least one plasticizer in a cycloaliphatic or predominantly cycloaliphatic solvent; and (b) the evaporation of said solvent in order to obtain a thermoplastic elastomer film.

Advantageously, the method of preparation according to the invention includes, after step (a) and before step (b), an intermediate step (c) consisting in dipping a former, preferably made of porcelain, preheated to a temperature between 25 and 50° C. into the liquid solution (A), so as to result, after evaporation of the solvent during step (B), in a thermoplastic elastomer film having the final shape of the expected article, for example a glove, a fingerstall or a condom.

Steps (a) to (b), optionally including step (c), are, of course, repeated as many times as necessary when it is desired to manufacture a multilayer film.

After step (b), the thermoplastic elastomer film is preferably dried at a temperature of between 30 and 80° C. for a time of between 15 and 300 minutes.

The cycloaliphatic solvent is preferably chosen from cyclohexane, methylcyclohexane, ethylcyclohexane and mixtures thereof.

The predominantly cycloaliphatic solvent used during step (a) is a mixture of at least one cycloaliphatic solvent and of at least one aromatic solvent, in which the aromatic solvent represents at most 25% by weight and even more particularly at most 10% by weight relative to the total amount of solvent used.

Among the predominantly cycloaliphatic solvents, mention may especially be made of the mixture methylcyclohexane/toluene in portions of 9/1 by weight and the mixture methylcyclohexane/xylene in the same proportions by weight.

The nature of the S-EB-S block copolymers, of the S-EP-S-EP structuring agent and of the plasticizer, and also their respective portions, are preferably as defined above.

The subject of the present invention is also the liquid solution (A) used during the method of manufacture and as defined above.

Finally, the subject of the invention is also the thermoplastic elastomer film and the shaped thermoplastic elastomer article that are able to be obtained using said method of preparation.

Apart from the above arrangements, the invention comprises yet other arrangements that will emerge from the following description, which refers to a comparative example of the viscometric characteristics of solutions based on one or two thermoplastic elastomers in a predominantly cycloaliphatic solvent, to a comparative example of production of thermoplastic elastomer gloves using liquid solutions containing one or two thermoplastic elastomers, a comparative example of characterization of mechanical properties of the thermoplastic films obtained from liquid solutions containing one or two thermoplastic elastomers, and also to the appended figures in which:

EXAMPLE 1

Comparison of the Viscometric Characteristics of Solutions Based on One or Two S-EB-S Copolymers in a Predominantly Cycloaliphatic Solvent The object of this example is to measure the viscometric characteristics of liquid solutions of thermoplastic elastomers, obtained by dissolving, in a predominantly cycloaliphatic solvent, a single S-EB-S block copolymer associated with a plasticizer and optionally with an S-EP-S-EP structuring agent, compared with those obtained by dissolving two S-EB-S block copolymers associated with the same plasticizer but without the structuring agent.

1) Equipment and Products Used

S-EB-S block elastomers:
  S-EB-S A: a product of molar mass greater than 75 000 g/mol, containing 31% styrene by weight, sold under the brand name KRATON® G1654ES by Kraton Polymers;
  S-EB-S B: a product of molar mass greater than 75 000 g/mol, containing 30% styrene by weight, sold under the brand name KRATON® G1650ES by Kraton Polymers;
  S-EB-S C: a product of molar mass greater than 75 000 g/mol, containing 33% styrene by weight, sold under the brand name KRATON® G1651ES by Kraton Polymers;

Structuring agent: an S-EP-S-EP block copolymer having a molar mass of about 70 000 g/mol and containing 21% styrene by weight, sold under the brand name KRATON® G1730 by Kraton Polymers;

Plasticizer: a paraffinic oil sold under the brand name PRIMOL® 352 by Esso;

Predominantly cycloaliphatic solvent: a methylcyclohexane/toluene mixture in proportions of 9/1 by weight;

Viscosity measurement: in this example, all the viscosities were measured at a temperature of 20° C. using a HAAKE® VT550 rheometer in an NV double-gap Couette geometry and with a shear rate of 100 $s^{-1}$.

2) Preparation of the Elastomer Solutions

Solutions 1 to 3 were prepared by weighing the various constituents, which were then introduced, with stirring, into a suitable container that contained the desired amount of solvent, in the proportions given in Table II below:

TABLE II

|  | Solution No. 1 (*) | Solution No. 2 | Solution No. 3 (*) |
|---|---|---|---|
| S-EB-S A (in g) | 100 | 100 | — |
| S-EB-S B (in g) | — | — | 50 |
| S-EB-S C (in g) | — | — | 50 |
| Structuring agent (in g) | — | 25 | — |
| Plasticizer (in g) | 62.5 | 70 | 62.5 |
| % plasticizer relative to the total weight of the polymers | 62.5 | 62.5 | 62.5 |

(*) Solutions not forming part of the invention: solution No. 1 contained no structuring agent; moreover, solution No. 3 contained two S-EB-S block elastomers as described, for example, in patent application EP 0 488 021.

It is important to point out that each of these solutions contained the same relative amount of plasticizer, this being expressed relative to the sum of the masses of the elastomer compounds (S-EB-S and S-EP-S-EP).

The solid content of each of the solutions was between 13 and 18%.

Figure 1:
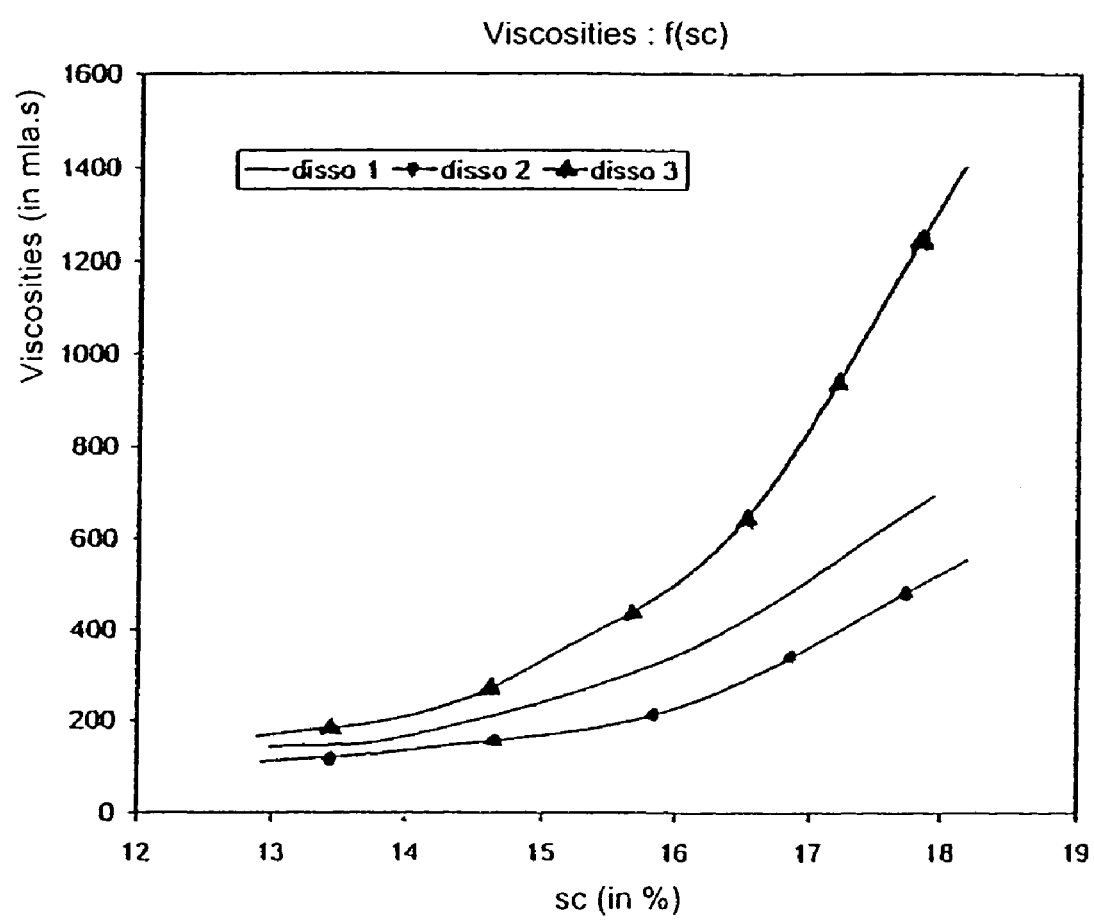
FIG. 1 shows the viscosity measured as a function of the solids content of the solutions prepared in Example 1.

The viscosity curves measured as a function of the solids content are shown in FIG. 1, in which the curve represented by a continuous line corresponds to the viscosity of solution No. 1, the curve represented by a line broken by solid circles corresponds to the viscosity of solution No. 2 and the curve represented by a line broken by solid triangles corresponds to the viscosity of solution No. 3.

These results show that solution No. 2, which is in accordance with the invention as it contains only a single S-EB-S block copolymer in association with a structuring agent chosen from S-EP-S-EP block copolymers, has, for an equivalent solids content, a substantially lower viscosity than solutions No. 1 and No. 3 that do not form part of the invention.

In addition, if we consider this time an equivalent viscosity, it is possible to use a solution according to the invention having a higher solids content, thus making it possible to reduce the amount of solvent used, and consequently the costs and the toxicological and environmental risks associated with the use of such solvents.

EXAMPLE 2

Comparative Study of the Mechanical Properties of Thermoplastic-Elastomer Thin-Walled Films Prepared from Liquid Solutions Containing One or Two S-EB-S Block Copolymers Using a Dipping Process 1) Equipment and Method In this example, solutions No. 2 and No. 3 having a solids content of 15%, such as prepared above in Example 1, were used.

A comparative solution No. 4 not forming part of the invention and having the composition indicated below was also prepared using the same preparation protocol as that described above in Example 1.

| Solution No. 4 | |
|---|---|
| S-EB-S A | 100 g |
| methylcyclohexane/toluene mixture (9/1) | 900 g |
| solids content | 10% |

Using each of the solutions No. 2, 3 and 4, corresponding thin-walled films (film 2, film 3 and film 4) were produced using a dipping process.

To do this, a former made of porcelain biscuit, preheated to a temperature of 45° C., was dipped into the elastomer solution. The operation was carried out in an environmentally controlled room at 20° C. The former was kept immersed in the solution for about 10 seconds and then slowly withdrawn. It was then immediately rotated for about 3 minutes so as to allow good distribution of the entrained solution layer on the former. The former was then dried for 18 minutes in an oven, the temperature of which was maintained at 45° C. The dipping operation was then repeated 3 times so as to obtain a thermoplastic elastomer film consisting of four successive layers, resulting in a final thickness of about 200 µm.

2) Characterization of Films Obtained

Film 4 Obtained from Solution No. 4:

As soon as the first layer was overlaid, the appearance of star-shaped fracture initiators was noted, which increased in number during superposition of the following layers. These fracture initiators resulted from the generation of tensile stresses while the film was being dried, the stiffness of which not allowing dissipation. This film 4 which contains only a single S-EB-S block copolymer, but no structuring agent with S-EP-S-EP blocks, and therefore not forming part of the invention, could not be used.

Film 3 Obtained from Solution No. 3:

No cracking was detected in the film during dipping, nor after the successive drying operations. However, the film obtained exhibited some veining and macroscopic heterogeneities, possibly resulting from poor organization of the elastomers during the solvent evaporation step. This film, obtained from a solution containing the combination of two S-EB-S block copolymers not forming part of the invention, cannot be used either.

Film 2 Obtained from Solution No. 2:

This film according to the invention, i.e. one containing the combination of a single S-EB-S block copolymer and an S-EP-S-EP structure agent, has a perfectly correct appearance, with neither cracking nor veining. The "film stretch" is also very good.

The films were then characterized by DMTA (Dynamic Mechanical Thermal Analysis). DMTA consists in subjecting a specimen to deformation stresses under precise temperature and frequency conditions, and in obtaining and then processing all the rheological quantities that characterize the material, such as the value of tangent δ (tan δ).

Tan δ is defined as the ratio of the quantities E'/E":

E' is defined as the storage modulus, which characterizes the energy that is stored in the specimen in elastic form, and is therefore recoverable;

E" is the loss modulus; it is characterized by the energy dissipated in the material by friction between macromolecules of which it is composed and resulting of the viscosity of the medium.

Figure 2:
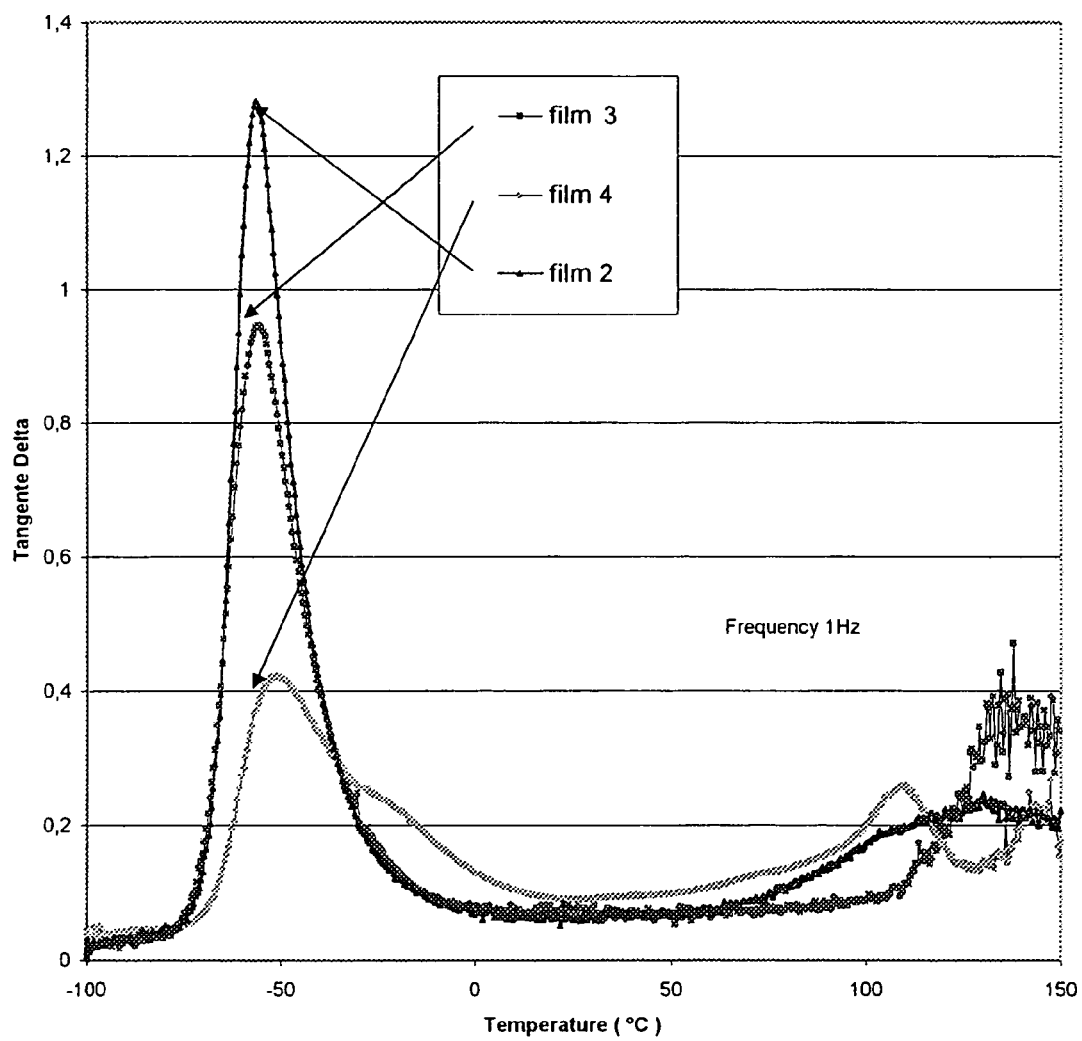
FIG. 2 shows the thermogram resulting from DMTA (Dynamic Mechanical Thermal Analysis) of the three elastomer films produced in Example 2.

The DMTA was carried out under the following conditions:
thermal ramp going from −150 to +125° C., at 2° C. per minute;
frequency: 1 Hz.
The results obtained are given in FIG. 2.
These Results Show:
as regards the unplasticized film obtained from solution No. 4: the width of the peak relating to EB transmission and the value of tan δ in the rubbery plateau are indicative of the fact that there is no sharp phase separation between the PS domains and EB continuous phase (elastomer/polystyrene phase separation);
as regards the plasticized film obtained from solution No. 3: better elastomer/polystyrene phase separation is observed; and
as regards the plasticized film according to the invention, obtained from solution No. 2; the elastomer/polystyrene phase separation observed is very good. In addition, the value of tan δ at the elastomeric phase transmission is very high, which is a manifestation of good molecular mobility (high viscous dissipation). The role of the S-EP-S-EP block structuring agent on the mobility of the chains, and consequently on the film formability of the material, is thus demonstrated.

EXAMPLE 3

Mechanical Properties of an Elastomer Film Prepared from a Single S-EB-S Block Copolymer and an S-EP-S-EP Structuring Agent, Compared with Those of an Elastomer film Prepared from a Blend of Two S-EB-S Block Copolymers The purpose of this example is to compare the mechanical properties of an elastomer film obtained from a blend of two S-EB-S block copolymers (one with a molar mass greater than 75 000 g/mol and the other with a molar mass of less than 75 000 g/mol) with those of an elastomer film obtained from only one S-EB-S block copolymer of molar mass greater than 75 000 g/mol associated with an S-EP-S-EP block structuring agent.
For the purposes of comparison, the two blends contain no plasticizer.

1) Equipment and Method
S-EB-S block elastomers:
S-EB-S A: as defined above in Example 1, with a molar mass of greater than 75 000 g/mol;
S-EB-S D: a product of molar mass of less than 75 000 g/mol, containing 30% styrene by weight, sold under the brand name KRATON® G1652 by Kraton Polymers;
Structuring agent: KRATON® G1730 as defined above in Example 1;
Predominantly cycloaliphatic solvent: a methylcyclohexane/toluene mixture in proportions of 9/1 by weight.

2) Preparation of the Elastomer Solutions
Solutions 5 and 6 were prepared as described above in Example 1, in the proportions given in Table III below.

TABLE III

|  | Solution No. 5 (*) | Solution No. 6 |
| --- | --- | --- |
| S-EB-S A (in g) | 100 | 100 |
| S-EB-S D (in g) | 25 | — |
| Structuring agent (in g) | — | 25 |
| Solids content (%) | 10 | 10 |

(*) Solution not forming part of the invention as it contains a blend of two S-EB-S block copolymers.

Figure 3:
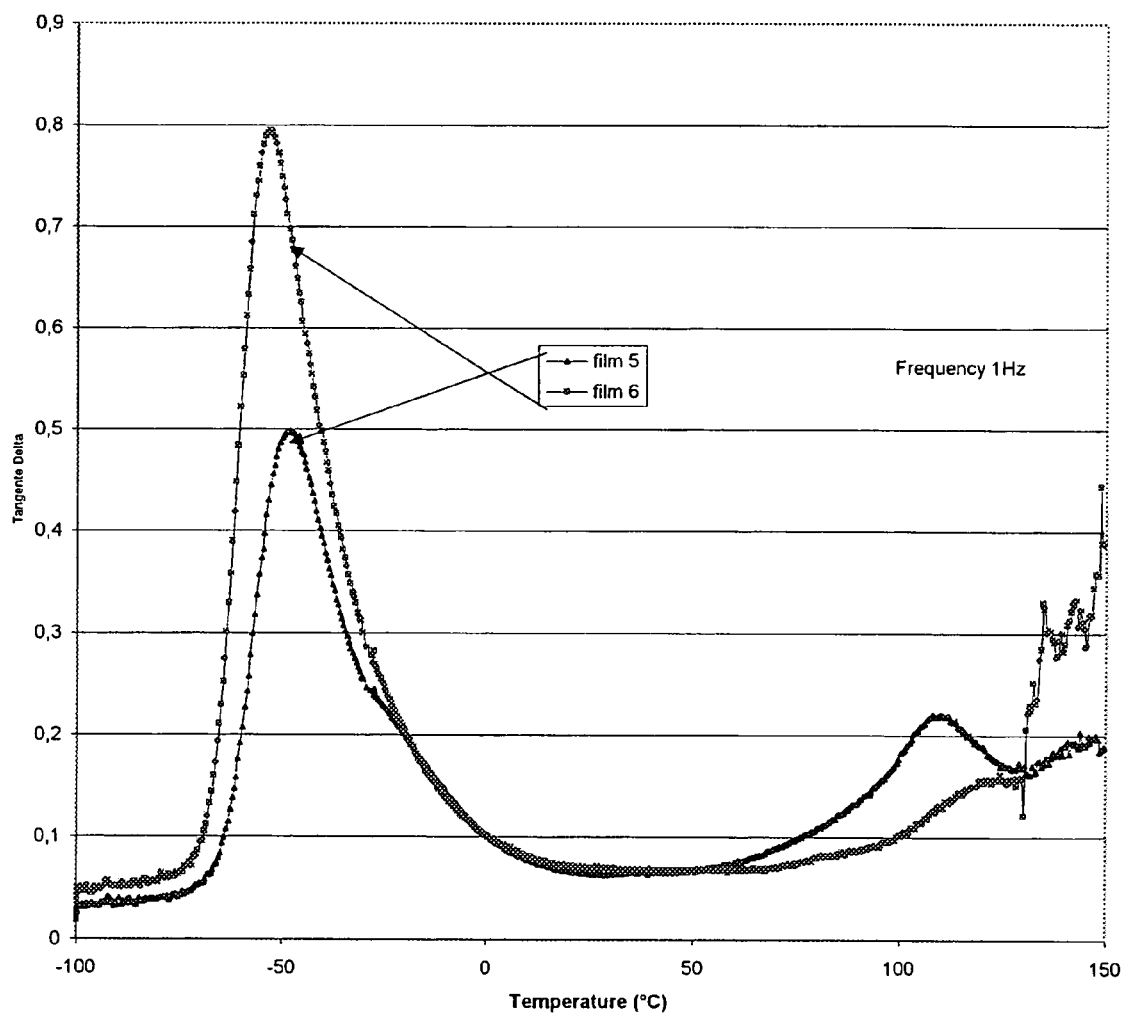
FIG. 3 shows the thermogram resulting from DMTA analysis of the two elastomer films produced in Example 3.

3) Preparation of the Films and Characterizations
Solutions No. 5 and No. 6 were used for manufacturing films 5 and 6 using the dipping process described above in Example 2.
During drying, no defect nor any anomaly was detected in film 6 according to the invention.
In contrast, the stretch of film 5 not forming part of the present invention was inferior to that of film 6.
DMTA thermogrammes produced under the conditions described above, are shown in FIG. 3.
The curves plotted in this figure show a substantial difference in morphology between the two films. Clearly, film 6 according to the invention has, at the elastomer phase transition temperature (between about −80° C. and −25° C.), a much higher tan δ value, indicative of higher chain mobility.

The invention claimed is:
1. A thermoplastic-elastomer-based film comprising:
a single styrene/ethylene-butylene/styrene (S-EB-S) block copolymer having a molar mass greater than or equal to 75 000 g/mol;
at least one structuring agent comprising styrene/ethylene-propylene/styrene/ethylene-propylene (S-EP-S-EP) block copolymer, the structuring agent representing from 5 to 50 parts by weight per 100 parts by weight of the S-EB-S copolymer; and
at least one plasticizer.
2. The film as claimed in claim 1, wherein the S-EB-S block copolymer comprises 29 to 33% by weight of styrene relative to the total weight of said S-EB-S copolymer.
3. The film as claimed in claim 1, wherein the S-EB-S block copolymer has a molar mass of between 75 000 and 300 000 g/mol.
4. The film as claimed in claim 1, wherein the S-EP-S-EP block copolymer has a molar mass of less than or equal to 200 000 g/mol.
5. The film as claimed in claim 1, wherein the S-EP-S-EP block copolymer comprise at most 25% by weight of styrene relative to the total weight of the S-EP-S-EP block copolymer.
6. The film as claimed in claim 1, wherein the plasticizer is a mineral oil.
7. The film as claimed in claim 1, wherein the plasticizer represents from 25 to 150 parts by weight per 100 parts by weight of the S-EB-S copolymer.
8. The film as claimed in claim 1, wherein the film is in the form of a monolayer or multilayer material.
9. The film as claimed in claim 1, wherein the film comprises one or more active chemical substances selected from the group consisting of antiseptic agents and virucides.
10. The film as claimed in claim 1, wherein the film is in the form of a glove, a fingerstall or a condom.
11. A method of manufacturing a tin-walled elastomer article comprising
shaping the film as claimed in claim 1 into the form of a thin-walled elastomer article.

12. A method of preparing a thermoplastic film as claimed in claim 1, the process comprising:
(a) preparing a liquid solution (A) by dissolving a single styrene/ethylene-butylene/styrene (S-EB-S) block copolymer having a molar mass greater than or equal to 75 000 g/mol, at least one structuring agent comprising styrene/ethylene-propylene/styrene/ethylene-propylene (S-EP-S-EP) block copolymer and at least one plasticizer in a cycloaliphatic or predominantly cycloaliphatic solvent; and
(b) evaporating the solvent to obtain the thermoplastic elastomer film.

13. The method as claimed in claim 12, further comprising dipping a former preheated to a temperature between 25 and 50° C. into the liquid solution (A) after said preparing step a) and before said evaporating step b).

14. The method as claimed in claim 12, wherein the cycloaliphatic solvent is selected from the group consisting of cyclohexane, methylcyclohexane, ethylcyclohexane and mixtures thereof.

15. The method as claimed in claim 12, wherein the predominantly cycloaliphatic solvent is a mixture which comprises at least one cycloaliphatic solvent and of at least one aromatic solvent, wherein the aromatic solvent represents at most 25% by weight relative to the total amount of solvent used.

16. The method as claimed in claim 15, wherein the predominantly cycloaliphatic solvent is a methylcyclohexane/toluene mixture or a methylcyclohexane/xylene mixture, in proportions of 9/1 by weight.

17. A liquid solution (A) comprising a single styrene/ethylene-butylene/styrene (S-EB-S) block copolymer having a molar mass greater than or equal to 75 000 g/mol, at least one structuring agent comprising styrene/ethylene-propylene/styrene/ethylene-propylene (S-EP-S-EP) block copolymer and at least one plasticizer in a cycloaliphatic or predominantly cycloaliphatic solvent.

18. A thermoplastic elastomer film produced by the method as claimed in claim 12.

19. A shaped thermoplastic elastomer article produces by the method as claimed in claim 13.

20. A thermoplastic-elastomer-based film comprising:
a single styrene/ethylene-butylene/styrene (S-EB-S) block copolymer having a molar mass greater than or equal to 75 000 g/mol, the S-EB-S block copolymer comprising 29 to 33% by weight of styrene relative to the total weight of said S-EB-S copolymer;
at least one structuring agent comprising styrene/ethylene-propylene/styrene/ethylene-propylene (S-EP-S-EP) block copolymer; and
at least one plasticizer.

21. A thermoplastic-elastomer-based film comprising:
a single styrene/ethylene-butylene/styrene (S-EB-S) block copolymer having a molar mass greater than or equal to 75 000 g/mol
at least one structuring agent comprising styrene/ethylene-propylene/styrene/ethylene-propylene (S-EP-S-EP) block copolymer, the S-EP-S-EP block copolymer comprising at most 25% by weight of the S-EP-S-EP block copolymer; and
at least one plasticizer.

22. A thermoplastic-elastomer-based film comprising:
a single styrene/ethylene-butylene/styrene (S-EB-S) block copolymer having a molar mass greater than or equal to 75 000 g/mol;
at least one structuring agent comprising styrene/ethylene-propylene/styrene/ethylene-propylene (S-EP-S-EP) block copolymer; and
at least one plasticizer, the plasticizer represents from 25 to 150 parts by weight per 100 parts by weight of the S-EB-S copolymer.

23. A thermoplastic-elastomer-based film comprising:
a single styrene/ethylene-butylene/styrene (S-EB-S) block copolymer having a molar mass greater than or equal to 75 000 g/mol;
at least one structuring agent comprising styrene/ethylene-propylene/styrene/ethylene-propylene (S-EP-S-EP) block copolymer; and
at least one plasticizer,
wherein the film is in the form of a monolayer or multilayer material.

24. A thermoplastic-elastomer-based film comprising:
a single styrene/ethylene-butylene/styrene (S-EB-S) block copolymer having a molar mass greater than or equal to 75 000 g/mol;
at least one structuring agent comprising styrene/ethylene-propylene/styrene/ethylene-propylene (S-EP-S-EP) block copolymer; and
at least one plasticizer,
wherein the film comprises one or more active chemical substances selected from the group consisting of antiseptic agents and virucides.

25. A thermoplastic-elastomer-based film comprising:
a single styrene/ethylene-butylene/styrene (S-EB-S) block copolymer having a molar mass greater than or equal to 75 000 g/mol;
at least one structuring agent comprising styrene/ethylene-propylene/styrene/ethylene-propylene (S-EP-S-EP) block copolymer; and
at least one plasticizer,
wherein the film is in the form of a glove, a fingerball or a condom.

* * * * *